Aug. 17, 1943.   G. YATES   2,327,148
SHEET METAL CLAMP
Filed May 6, 1942

GEORGE YATES,
INVENTOR.

BY P. R. Weilein

ATTORNEY.

Patented Aug. 17, 1943

2,327,148

UNITED STATES PATENT OFFICE 2,327,148

SHEET METAL CLAMP

George Yates, Glendale, Calif.

Application May 6, 1942, Serial No. 441,901

4 Claims. (Cl. 85—5)

This invention relates to temporary fasteners for clamping large metal sheets while they are being permanently secured together.

In the assembly of structures utilizing large sheets of metal, as in the production of airplane wings and the like, it has been customary to clamp the sheets together by means of temporary fasteners passing through openings in the sheets. Fasteners of the form described in the patent to Barker, 2,237,807, are commonly employed for this purpose. In general, this type of fastener involves a pair of elements which are adapted to be inserted through openings in the sheets, spring means being relied upon to produce relative axial movement between said elements to clamp the sheets together. Although a spring has certain advantages in such a structure, it also has certain disadvantages which are obviated by the present invention. Reliance upon a spring to produce the relative axial movement between the hole engaging elements results in the application of a high clamping force to thick material and a low clamping force to thin material. When such devices are applied to soft materials having a thickness in excess of that for which the clamp was designed, the excessive pressure produced tends to damage the work. It is impractical, or at least extremely difficult to assure that workmen assembling large sheets of material of various thicknesses will not utilize a clamp on material thicker than that for which it was designed, with the result that the springs employed in said devices are often sprung beyond their elastic limit, thus rendering the devices useless.

Fasteners of this general type have been devised with various types of screw mechanisms to produce the relative motion necessary. However, the use of screw threads in devices of this kind has in the past resulted in the complication of the operation of the device. Furthermore, if one of the axially movable members rotates with respect to the other, the device cannot be used to produce very high pressures required to hold the plates together, because the wedging action which is exerted on the rotating member tends to prevent its rotation. In addition to this, screw operated fasteners have a tendency to work loose when the material is pounded, or when riveting draws the sheets together. This can cause a misalignment or perhaps even cause the fasteners to drop out of the hole. At any rate, it is desirable to have a fastener which will remain tight and active in holding the sheets together until it is released by the operator.

With the above deficiencies of present devices in mind it is an object of the present invention to provide an improved sheet clamp in which spring means is not relied upon to produce the clamping force upon the work.

It is a further object of the present invention to provide a sheet clamp in which the force exerted by the clamp on the material is independent of the thickness of the material.

It is a further object of the present invention to provide an improved sheet clamp which can be inserted in the work without the use of special tools.

It is a further object of the present invention to produce a sheet clamp which is relatively indestructible.

It is a further object of the present invention to produce a sheet clamp which can be used on various thicknesses of material without damaging the material or the clamp.

It is a further object of the present invention to provide a sheet clamp which is effective to clamp various thicknesses of material together and which will not become loosened during the process of riveting or otherwise permanently securing the sheets together.

This invention possesses many other advantages and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of the invention is best defined by the appended claims.

Referring now to the drawing.

Figure 1:
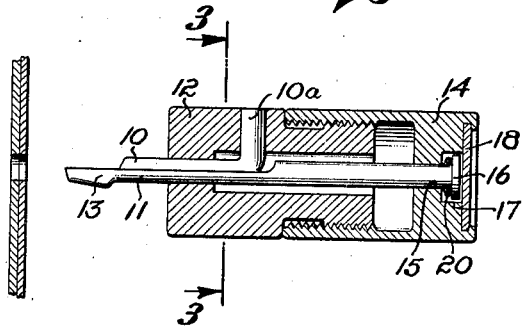
Figure 1 is a longitudinal section through one form of device embodying the present invention, showing the parts in one position of operation.

In general, the device contemplated by the present invention includes a pair of elements 10 and 11, which, when having a certain axial relationship, can be readily inserted through holes in the material to be clamped, and, upon relative axial movement thereafter, draw the material toward a body member 12. In the present instance, the hole engaging element 10 has been shown as secured to the body member 12 of the device, while the element 11 is axially movable with respect to the body member 12 and with respect to the member 10, the axial movement of this element 11 causing the desired clamping action. The element 10 may be secured to the body member 12 by any suitable means, as for example, by having its inner end passed through an opening through the side of the body member 12. The element 11 has a projection 13 on its outer end which does not hinder entry of the elements 10 and 11 through the holes in the work, but which, upon movement towards the body 12, causes the work to be clamped thereto. This is essentially the type of mechanism shown in the above mentioned prior patent, and the present invention deals with the means for producing this axial movement.

In order to produce axial movement of the element 11, a cap 14 is threadedly secured to the body member 12 and is secured to the element 11 in such a manner that rotation of the cap produces axial movement of this element 11 without rotation of this element. It has been found convenient to provide a bore 15 through the cap 14, through which the shank of the element 11 passes, sufficient clearance being provided to permit rotation of the cap relative to said element. The element 11 is headed as at 16 in order that axial movement of the cap 14 will be transmitted to the element 11. The head 16 is held in a counterbore 17 by means of a plug or disc 18, which may be secured to the cap 14 by simply rolling the edge of the cap over the plug after the plug has been inserted in place. For convenience in operation, the cap 14 has been provided with left handed threads, so that rotation to the right clamps the device to the work. The exterior surfaces of the body 12 and the cap 14 are knurled to provide a surface which can be grasped by the fingers for producing the relative rotation necessary to operate the device.

Figure 2:
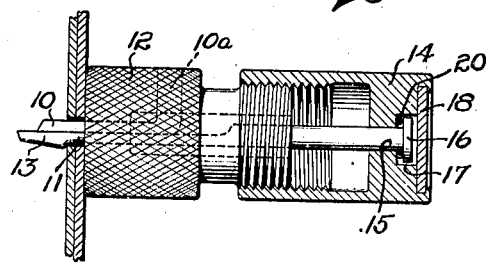
Figure 2 is a partial sectional view of the device shown in Figure 1, showing the parts in a different position of operation; and, Figure 3 is a transverse section taken through line 3—3 of Figure 1.
Figure 3:
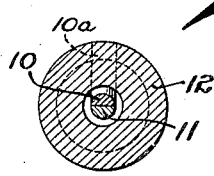

The device as just described is efficient in holding material together, but there are times when the unyielding nature of screw threads will cause the device to shake loose from the work as the work is secured by closely adjacent rivets. For this reason it is preferable to provide a small spring element 20 which gives a slight spring action to the element 11 but which is not depended upon primarily to produce the clamping force. A simple spring lock washer or a split ring is sufficient to produce this spring action and has been shown as being merely inserted under the head 16 of the element 11. It can be seen from examination of Figure 2 that clamping the elements 10 and 11 in place by rotation of the body 14 flattens this small spring washer 20. The clamping force is thus not dependent upon the strength of the spring 20 although if desired the spring can be made so stiff that it is not flattened entirely. The main point which is to be emphasized is that this device is not solely dependent upon the spring 20 to produce the clamping action. That is, the force produced by the member 13 against the back of the work is totally independent of the thickness of the work. Previous spring driven clamps give a force which is a function of the thickness of the material being clamped, which, as was pointed out before, is usually an undesirable result.

It can thus be seen that the above described device does not rely upon springs to produce the clamping action and that within its range of operation the clamping force is independent of the thickness of the work and can be made as great or as small as is required by the nature of the sheets being clamped together. Furthermore, although relative axial movement of the elements is obtained by means of a screw mechanism, it can be appreciated that there is no relative rotative movement of the elements 10 and 11, and furthermore, that the device is self-contained and does not require tools or separate parts for its use.

I claim:

1. A sheet clamp including a body and a pair of elements projecting therefrom adapted to be inserted in an opening in the material to be held, said elements being formed to clamp said material upon axial movement of one of said elements with respect to the other, a member threadedly engaging said body, and means connecting one of said elements to said member for axial movement therewith, said connecting means permitting rotation of said member relative to said element.

2. A sheet clamp including a body and a pair of elements projecting therefrom adapted to be inserted in an opening in the material to be held, said elements being formed to clamp said material upon axial movement of one of said elements with respect to the other, a member threadedly engaging said body, one of said elements passing through said member and having a head thereon operatively engaging said member to thereby cause axial movement of said element with said member, but permitting rotation of said member relative to said element.

3. A sheet clamp including a body and a pair of elements projecting therefrom adapted to be inserted in an opening in the material to be held, said elements being formed to clamp said material upon axial movement of one of said elements with respect to the other, a member mounted on said body for axial movement in response to rotation relative to said body, and spring means connecting one of said elements to said member for axial movement therewith.

4. A sheet clamp including a body and a pair of elements projecting therefrom adapted to be inserted in an opening in the material to be held, said elements being formed to clamp said material upon axial movement of one of said elements with respect to the other, a member threadedly engaging said body, one of said elements passing through said member and having a head thereon, a spring member operatively engaging said head and said member to thereby cause axial movement of said element with said member, but permitting yielding of said element with respect to said member.

GEORGE YATES.